Figure 1:
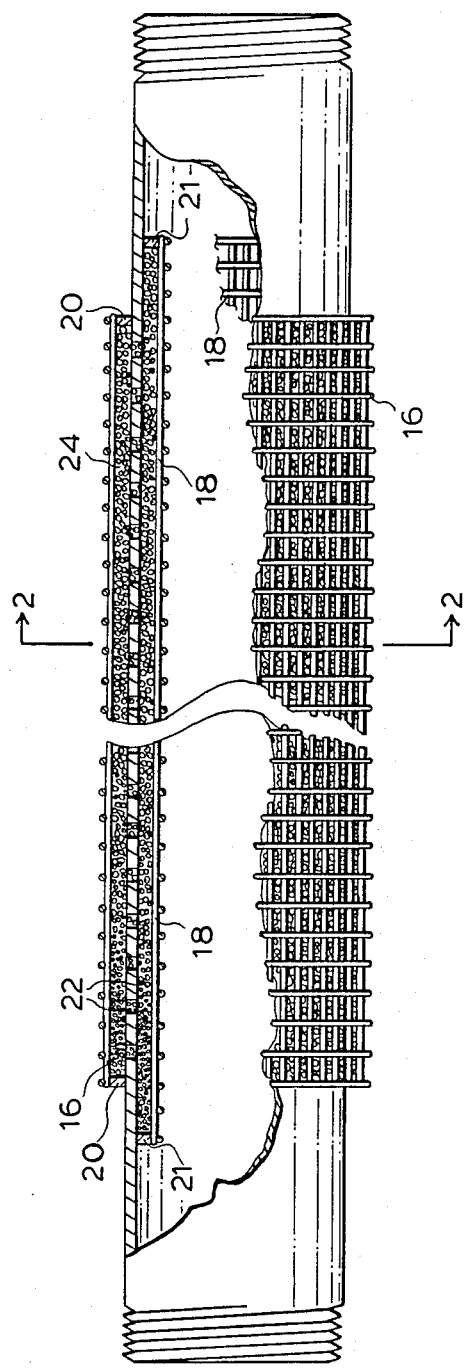

United States Patent [19]

Scott et al.

[11] Patent Number: 4,821,800

[45] Date of Patent: Apr. 18, 1989

[54] FILTERING MEDIA FOR CONTROLLING THE FLOW OF SAND DURING OIL WELL OPERATIONS

[75] Inventors: Leslie A. Scott; Maurice L. Dubois, both of Edmonton, Canada

[73] Assignee: Sherritt Gordon Mines Limited, Toronto, Canada

[21] Appl. No.: 126,797

[22] Filed: Dec. 1, 1987

[30] Foreign Application Priority Data

Dec. 10, 1986 [GB] United Kingdom ............... 8629574

[51] Int. Cl.$^4$ .................................... E21B 43/08
[52] U.S. Cl. .................................... 166/228; 166/230; 166/236; 75/251; 210/170; 210/291; 428/570; 428/667
[58] Field of Search ............... 166/227–230, 166/236; 210/291, 170; 428/570, 667; 75/251

[56] References Cited

U.S. PATENT DOCUMENTS

| | | | |
|---|---|---|---|
| 1,342,813 | 6/1920 | Huston | 166/228 X |
| 1,473,644 | 11/1923 | Rodrigo, Sr. | 166/228 X |
| 1,874,035 | 8/1932 | Fletcher | 166/228 |
| 1,992,718 | 2/1935 | Records | 166/228 |
| 2,119,563 | 7/1938 | Wells | 166/228 X |
| 2,391,609 | 12/1945 | Wright | 166/228 |
| 3,378,076 | 4/1968 | Metler | 166/227 |
| 3,896,028 | 7/1975 | Phillips, Jr. | 210/503 X |
| 4,360,377 | 11/1982 | Steck et al. | 75/251 X |
| 4,526,230 | 7/1985 | Kojicic | 166/236 |

FOREIGN PATENT DOCUMENTS

| | | | |
|---|---|---|---|
| 2518607 | 11/1975 | Fed. Rep. of Germany | 428/570 |
| 2941447 | 4/1980 | Fed. Rep. of Germany | 428/570 |
| 17967 | 6/1978 | Japan | 428/667 |
| 97419 | 7/1980 | Japan | 428/570 |
| 56-670 | 7/1981 | Japan | 428/667 |

Primary Examiner—Stephen J. Novosad
Assistant Examiner—John F. Letchford
Attorney, Agent, or Firm—Robert F. Delbridge; Arne I. Fors

[57] ABSTRACT

Sand is filtered from an oil flow from a sand-containing oil producing formation or interval of an oil well by passing the oil flow with entrained sand through a filter assembly containing filtering media in the form of a body of juxtaposed composite particles. Each composite particle has an iron-containing core surrounded by a continuous chromium cladding, the composite particles having a size to permit passage of the oil flow through the body of the composite particles while substantially preventing flow of sand therethrough.

10 Claims, 2 Drawing Sheets

FILTERING MEDIA FOR CONTROLLING THE FLOW OF SAND DURING OIL WELL OPERATIONS

This invention relates to filtering media for controlling the flow of sand during oil well operations.

In the recovery of oil from unconsolidated or unstable formations, sand may be present in the borehole, particularly during heavy oil recovery when thermal stimulation methods are used. Sand control is accordingly an important aspect of oil production in such cases. If the sand is not controlled, it (especially fine clay minerals) may partially or completely plug the borehole with the result that oil production is reduced or completely stopped, thereby necessitating costly periodic servicing to clear the well bore. Also, sand entrained in small quantities in the oil flow may damage pumping equipment in the well bore (downhole) and/or on the surface. Further, when a substantial amount of sand has been lost from the surrounding formation, the formation may collapse with resultant damage to or destruction of the well casing or liner and consequent reduction or stoppage of oil production.

In order to effect sand control, it is known to filter fluid flow to remove sand from the flow. Filtering media for this purpose is positioned in an oil well bore at the production level, either contained within a filter module or as a loose gravel pack, so as to permit flow of produced fluids or injection of fluids for formation stimulation without passing substantial amounts of sand present in the formation. The filtering media must be capable of withstanding well production conditions, such as a temperature range of from about 50° to about 300° C., a pH of from about 6 to about 12, high pressure (up to about 2000 psi (14 MPa)) and contact with fluids containing sulphur as elemental sulphur, hydrogen sulphide or sulphur dioxide in concentrations up to about 20% by weight. Also, the filtering media should comprise particles as spherical in shape as possible in order to provide the highest possible permeability in a closely packed particle bed.

Filtering media, such as slotted liners and screens and sand or gravel packs, which have been used for this purpose in the past, have not been capable of withstanding such production conditions and/or have not provided satisfactory sand filtration.

It is therefore an object of the invention to provide filtering media for controlling the flow of sand during oil well operations which will withstand such oil well production conditions in a better manner than known filtering media for this purpose.

According to the present invention, filtering media for sand control in oil well production comprises composite particles having iron-containing cores surrounded by a continuous chromium cladding.

It has been found that such filtering media provided satisfactory sand filtration and can satisfactorily withstand the well production conditions previously mentioned, including resisting sulphidation-corrosion and physical degradation, thereby enabling oil production to be maintained in a much better manner than before.

The present invention accordingly provides a method of filtering sand from an oil flow from a sand-containing oil producing formation or interval of an oil well, comprising passing the oil flow with entrained sand through a filter assembly containing filtering media comprising a body of juxtaposed composite particles, each composite particle having an iron-containing core surrounded by a continuous chromium cladding, said composite particles having a size to permit passage of the oil flow through the body of the composite particles while substantially preventing flow of sand therethrough.

Advantageously, the particles are substantially spherical with a diameter in the range of from about 3 to about 6 times the mean diameter of said particles in the oil producing formation or interval.

The composite particles may have a diameter in the range of from about 250 to about 2000 micrometers, with the chromium cladding having a thickness in the range of from about 4 to about 30 micrometers.

The cores of the composite particles may be steel shot, stainless steel shot or cast iron shot, preferably cast and quenched steel shot and preferably containing from about 0.8 to about 1.2% by weight carbon.

The present invention also provides a filter assembly for use in filtering sand from oil flow from an oil producing formation or interval of an oil well, the filter assembly comprising a perforated pipe member, an outer annular wire mesh screen surrounding the pipe member, an inner annular wire mesh screen extending longitudinally within the pipe member said outer and inner annular screens defining an annular chamber within which the perforated pipe member is located, and filtering media comprising a body of juxtaposed composite particles in the annular chamber, the composite particles being smaller than the perforations in the pipe member and retained in place by the screens.

The present invention also provides a composite particle suitable for use as filtering media in filtering sand from oil flow from an oil producing formation or interval of an oil well, the composite particle comprising an iron-containing core surrounded by a continuous chromium cladding, the particle having a diameter in the range of from about 250 to about 2000 micrometers, and the chromium cladding having a thickness in the range of from about 4 to about 30 micrometers.

The present invention further provides a process for making composite particles comprising iron-containing cores surrounded by continuous chromium cladding, the process comprising providing substantially spherical iron-containing cores having a diameter in the range of from about 250 to about 2000 micrometers, providing chromium particles with a particle size in the range of from about 40 to about 150 micrometers, mixing the iron-containing cores and chromium powder together to form a mixture, and heating the mixture in an inert atmosphere at a temperature in the range of from about 850° to about 950° C. until the cores are clad with a continuous chromium cladding with a thickness in the range of from about 4 to about 30 micrometers.

Figure 2:
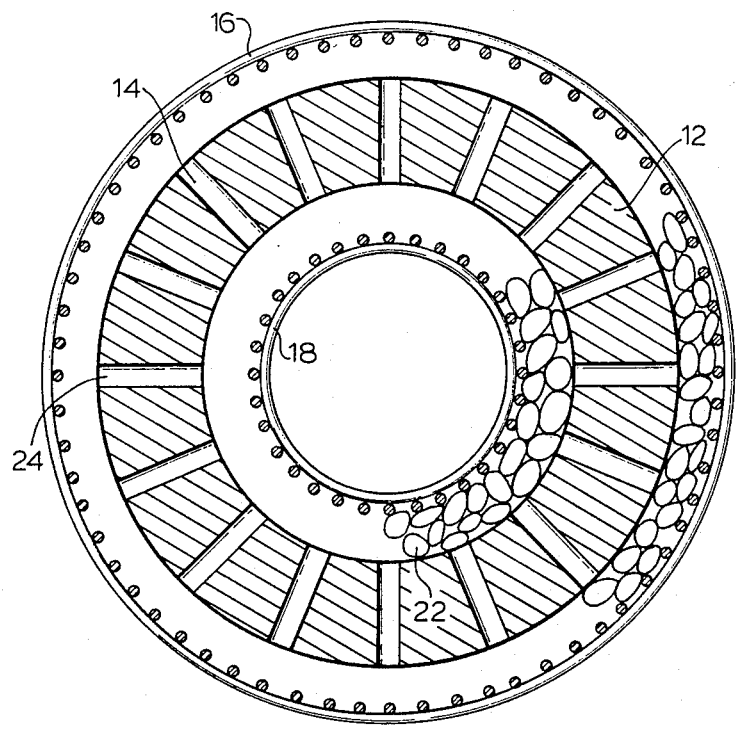

Embodiments of the invention will now be described, by way of example, with reference to the accompanying drawings, of which:

FIG. 1 is a side view, partly in section of a filter assembly, the mesh of the wire screens having been substantially enlarged to show the composite particles, and FIG. 2 is a sectional view along the line 2—2 of FIG. 1.

Referring to the drawings, a filter assembly comprises a pipe 12 which is externally threaded at each end for attachment to a conventional oil well pipe, for example near to the inlet of an oil well pump. The pipe 12 had apertures 14 over most of its length, except for the end portions. The perforated portion of pipe 12 is surrounded by an annular wire mesh screen 16 of larger diameter than the external diameter of the pipe 12 and an inner annular wire mesh screen 18 of lesser diameter than the internal diameter of pipe 12 is located within the perforated portion of pipe 12. The inner and outer annular screens 16, 18 are supported by annular spacers 20, 21 respectively which are welded in place at opposite ends of the screens 16, 18. Filtering media consisting of composite particles 22 in accordance with the invention are packed in the annular chamber 24 between the inner annular screen 18 and the outer annular screen 16 to form a body of juxtaposed composite particles. The composite particles 22 are much smaller than the apertures 14 in the pipe 12, but are larger than the mesh openings in the screens 16, 18 so that the composite particles 22 are retained in place by the screens 16, 18.

In a typical example, the pipe 12 may be about 5 meters in length with an outer diameter of about 13 cm and an inner diameter of about 11 cm and with about 525 apertures 14 per meter spaced around the circumference of the pipe 12, each aperture having a diameter of about 1 cm. The outer wire screen 16 may have a diameter of about 14 cm and the inner wire screen 18 may have a diameter of about 10 cm. Each wire screen 16, 18 may be of 0.3 mm keystone stainless steel with the screen mesh opening size being about 75% of the smallest composite particle size.

Examples of processes for the production of chromium clad shot for use as filtering media in accordance with the invention will now be described.

EXAMPLE 1 (BATCH PROCESS)

A furnace charge of the following composition is blended to homogenize: 0.5% to 5% by weight chromium powder (mean particle size 37 to 150 $\mu$m, $-100+400$ mesh), 0.5 to 2% by weight ammonium chloride powder (less than 150 $\mu$m, $-100$ mesh) and 92 to 99% by weight shot core. The shot core may be of stainless steel, steel or cast iron and a screen fraction in the as produced (cast or milled) or heat treated condition, and sized by well known criteria for filtering a particular well bore formation sand.

The blended charge is discharged into steel boats, spreading the charge to maximum bed depth of 40 mm. The charge is overlaid with a loose fitting lid and loaded into a furnace which is purged in $H_2$ atmosphere at $T<350°$ C. for 15 to 30 minutes. The charge is moved into the furnace hot zone at 850° C. to 950° C. and heat treated 1 to 3 hours in $H_2$. Following the heat treatment period, the boat is cooled under $H_2$ at $T=100°$ C. (as may be accomplished in a water jacketed cooling zone) for 1 to 2 hours. The resultant composite particles are removed and ground or pulverized to separate individual composite particles without removing the chromium cladding.

To produce a complete chromium cladding of a thickness sufficient to provide the necessary corrosion resistance, the chromizing heat treatment may be repeated as necessary using the above procedure and substituting the separated composite particles for the steel shot core. Unconsumed chromium or chromium compound powder may be added to the rechromizing charges during blending.

The final composite particles are screened and rinsed in water, then acetone, and dried at $T<100°$ C. to separate the chromium clad shot from unconsumed chromium and chromium compound particles which may then be discarded. A sample of treated shot mounted, polished and etched to show the chromium cladding (i.e. with 0.5% Nital solution) allows evaluation of the cladding thickness density and uniformity. The outside surface of the composite particles will have a minimum chromium content of 30% by weight.

A preferred process is as above using the following parameters:
  (a) The preferred core material is "as cast" quenched steel shot. Typical chemistry C=0.8 to 1.2%, Si=0.4 to 1.5%, S=0.05% max, P=0.05% max.
  (b) 2 to 3% by weight Cr powder, 37 to 74 $\mu$m particle size, and 1% $NH_4Cl$ (activator) less than 74 $\mu$m particle size.
  (c) Treatment time is hot zone for 50 kg charge 1.5 to 2 hours.
  (d) Chromizing heat treatment repeated once, i.e. 2 heat treatments, to produce composite particles with a substantially even chromium rich cladding of 4 to 20 $\mu$m in thickness.

EXAMPLE 2 (CONTINUOUS PROCESS)

A furnace charge of the following composition is blended to homogenize: 4 to 6% by weight chromium powder (mean particle size 40 to 150 $\mu$m, $-100+325$ mesh), 0.5 to 2.0% by weight ammonium chloride (less than 150 $\mu$m, $-100$ mesh) and 92 to 95.5% shot core. The short core may be of stainless steel, steel or cast iron and a screen fraction in the as produced (cast or milled) or heat treated condition, and sized by well known criteria for filtering a particular well bore formation sand.

The blended charge is discharged into a hopper assembly which continuously feeds the blended charge to the entrance of a controlled atmosphere, inclined, rotary cylindrical furnace. The feed rate, furnace inclination and rotation speed are adjusted to give a maximum bed depth of 40 mm and a mean charge hot zone residence time of 0.5 to 3.0 hours. The furnace is continuously purged with a hydrogen atmosphere. The entrance and exit end zones of the furnace have temperatures less than 350° C., with mean residence times of 15 to 45 minutes each. The mean hot zone temperature is in the range of from 850° C. to 950° C.

The product composite particles are continuously discharged from the exit end of the furnace, ground or pulverized, screened, rinsed in water, then acetone and dried at less than 100° C. to separate the chromium clad shot from the uncomsumed chromium and chromium compounds which may then be discarded. A sample of treated shot mounted, polished and etched to show the chromium cladding (i.e. with 0.5% Nital solution) allows evaluation of the cladding thickness, density and uniformity. The outside surface of the composite particles will have a minimum chromium content of 30% by weight.

A preferred process using the continuous rotary furnace is as above using the following parameters:
  (a) The preferred core material is "as cast" quenched steel shot. Typical chemistry C=0.8 to 1.2%, Si=0.4 to 1.5%, S=0.05% max, P=0.05% max.
  (b) 4 to 6% by weight Cr powder, 37 to 74 $\mu$m particle size, and 1% $NH_4Cl$ (activator) less than 74 $\mu$m particle size.
  (c) Treatment time (mean charge hot zone residence time) 1.0 to 1.5 hours, preheating and cooling times (residence times in entrance and exit zones respectively) 20 to 40 minutes.

This process has the advantage that it produces chromium clad shot with a substantially even chromium rich cladding of 4 to 20 μm in thickness in one heat treatment.

Such processes differ in various ways from the well known art of chromizing as described for example in U.S. Pat. Nos. 2,825,658, 2,851,375, 2,885,301, 3,021,231 and Canadian Pat. No. 943,016 in which a chromium diffusion layer is applied to wrought steel products. The variations are as follows:

(1) The initial heat treatment uses "as cast" shot, the martensitic/bainitic structure being advantageous to initial chromizing deposition kinetics;

(2) To limit the chromium diffusion inward away from the surface and minimize porosity and cracking of the cladding, lower than usually used heat treatment temperatures of 850° to 950° C. are used;

(3) The carbon level of the preferred steel shot (0.8-1.2%) is used to limit chromium diffusion into the core by formation of fine carbides at the cladding/core interface (carbide formation is avoided in known chromizing applications).

These three conditions act together to form a rapid deposition of a thermally bonded cladding that concentrates the chromium at the surface where it provides the necessary corrosion protection.

Chromium clad shot in accordance with the present invention may be produced in a wide range of screen sizes and can be designed to provide sand control based on the well sand core sample screen analyses. Typical sizes are as follows:

| Tyler Mesh | μm (approx) | Grade |
|---|---|---|
| −10 +30 | 550-1500 | coarse |
| −20 +40 | 375-850 | medium |
| −30 +60 | 250-550 | medium fine |
| −40 +60 | 250-375 | fine |

It has been found that the chromium clad shot is especially useful in conditions where bitumen in the oil well contains more than about 0.5% sulphur by weight and where thermal stimulation methods are used for enhanced oil recovery.

Other embodiments of the invention will be readily apparent to a person skilled in the art, the scope of the invention being defined in the appended claims.

We claim:

1. A method of filtering sand from an oil flow from a sand-containing oil producing formation or interval of an oil well comprising passing the oil flow with entrained sand through a filter assembly containing filtering media comprising a body of juxtaposed composite particles, each composite particle having an iron-containing core surrounded by a continuous chromium cladding, said composite particles having a size to permit passage of the oil flow through the body of the composite particles while substantially preventing flow of sand therethrough, said composite particles being substantially spherical with a diameter in the range of from about 250 to about 2000 micrometers, the chromium cladding of each composite particle having a thickness in the range of from about 4 to about 30 micrometers, and said iron-containing core of each composite particle containing from about 0.8 to about 1.2% by weight carbon.

2. A method according to claim 1 wherein the composite particles are substantially spherical with a diameter in the range of from about 3 to 6 times the mean diameter of sand particles in the oil producing formation or interval.

3. A method according to claim 1 wherein the iron-containing core of each composite particle is steel shot, stainless steel shot or cast iron shot.

4. A method according to claim 3 wherein the shot core of each composite particle is cast and quenched steel shot containing from about 0.8 to about 1.2% by weight carbon.

5. A filter assembly for use in filtering sand from oil flow from a sand-containing oil producing formation or interval of an oil well, said filter assembly comprising a perforated pipe member, an outer annular wire mesh screen surrounding the pipe member, an inner wire mesh screen extending longitudinally within the pipe member, said outer and inner annular screens defining an annular chamber within which the perforated pipe member is located, said annular chamber containing filtering media comprising a body of juxtaposed composite particles smaller than the performations in the pipe member and retained in place by the screens, each composite particle having an iron-containing core surrounded by a continuous chromium cladding, said composite particles having a size to permit passage of the oil flow through the body of the composite particles while substantially preventing flow of sand therethrough, said composite particles being substantially spherical with a diameter in the range of from about 250 to about 2000 micrometers, the chromium cladding of each composite particle having a thickness in the range of from about 4 to about 30 micrometers, and said iron-containing core of each composite particle containing from about 0.8 to about 1.2% by weight carbon.

6. A filter assembly according to claim 5 wherein the iron-containing core of each composite particle is steel shot, stainless steel shot or cast iron shot.

7. A filter assembly according to claim 6 wherein the shot core of each composite particle is cast and quenched steel shot containing from about 0.8 to about 1.2% by weight carbon.

8. A composite particle comprising an iron-containing core surrounded by a continuous chromium cladding, the particle having a diameter in the range of from about 250 to about 2000 micrometers, the chromium cladding having a thickness in the range of from about 4 to about 30 micrometers, and said iron-containing core containing from about 0.8 to about 1.2% by weight carbon.

9. A composite particle according to claim 8 wherein the core is steel shot, stainless steel shot or cast iron shot.

10. A composite particle according to claim 9 wherein the shot core is cast and quenched steel shot containing from about 0.8 to about 1.2% by weight carbon.

* * * * *